United States Patent

[11] 3,616,267

[72] Inventors George A. McNeill
    Springfield, Mass.;
    Jerry D. Sacks, Houston, Tex.
[21] Appl. No. 764,395
[22] Filed Oct. 2, 1968
[45] Patented Oct. 26, 1971
[73] Assignee Monsanto Company
    St. Louis, Mo.

[54] PROCESS CONTROL FOR EXTRACTIVE DISTILLATION OPERATION HAVING A CONSTANT TAKE-OFF VOLUME PRODUCT STREAM
    3 Claims, 6 Drawing Figs.
[52] U.S. Cl. .................................................. 203/3,
    203/50, 203/DIG. 18, 202/160
[51] Int. Cl. ...................................................... B01d 3/42
[50] Field of Search............................................ 203/3, 2,
    50, DIG. 18; 202/160; 196/132; 62/21, 37;
    208/DIG. 1

[56] References Cited
    UNITED STATES PATENTS
    2,696,464  11/1954  Mathis et al. ................. 203/3
    2,749,281  6/1956   Feiro ............................ 203/3
    2,977,289  3/1961   Kron ............................ 203/3
    3,224,947  12/1965  Lupfer .......................... 202/206
    3,325,377  6/1967   Hacklander .................... 203/3
    3,354,053  11/1967  Johnson ........................ 203/3

OTHER REFERENCES

Moczek et al., Control of a Distillation Column for Producing High-Purity Overheads and Bottoms Streams I & EC Process Design and Development, Vol. 2, No. 4, Oct. 1963, pp. 288-296

Primary Examiner—Wilbur L. Bascomb, Jr.
Attorneys—M. N. Cheairs, Elizabeth F. Sporar and C. James Bushman ABSTRACT: A process for the continuous separation of a feed mixture in a separation zone having a plurality of product streams withdrawn from said separation zone, at least one of said product streams being withdrawn from an upper region of said separation zone and at least one of said product streams being withdrawn from a lower region of said separation zone, said process comprising passing said feed mixture to a column in said separation zone, setting at least one of said product streams of said column at a constant takeoff volume, measuring a property representative of the composition of one of said product streams and converting said measurement to a signal representative of said measurement and using said signal to manipulate the flow rate of said feed mixture in response to such measurement such that such measurement remains substantially constant at a predetermined value.

PATENTED OCT 26 1971 3,616,267

*INVENTOR.*
GEORGE A. MCNEILL
JERRY D. SACKS
BY M. N. Chean

ATTORNEY

PATENTED OCT 26 1971

INVENTOR.
GEORGE A. MCNEILL
BY JERRY D. SACKS

ATTORNEY

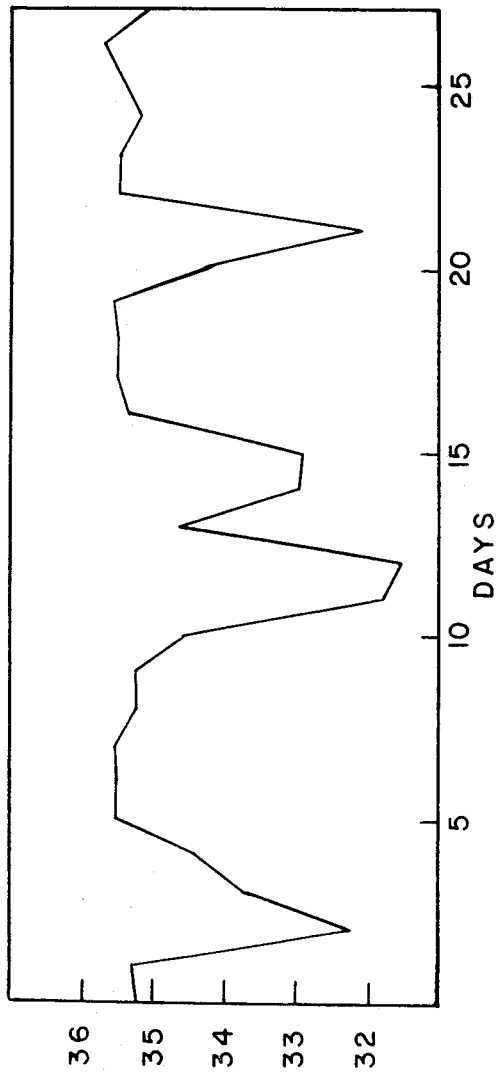
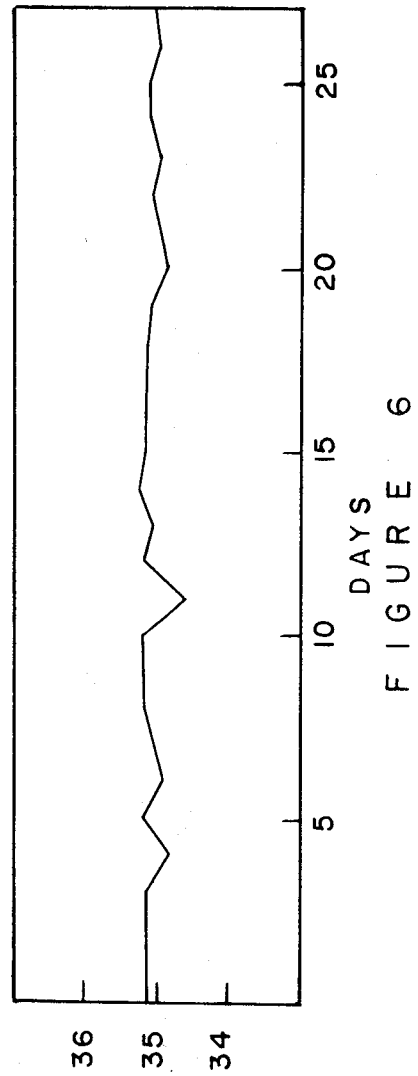

3,616,267

PROCESS CONTROL FOR EXTRACTIVE DISTILLATION OPERATION HAVING A CONSTANT TAKE-OFF VOLUME PRODUCT STREAM

BACKGROUND OF THE INVENTION

The present invention relates to a method for the separation of a feed mixture into its various components. More particularly, the present invention relates to a method for controlling the operation of a separating column such as a distillation, extractive distillation or liquid-liquid extraction column in order to produce terminal product streams with desired specifications at optimum conditions and to provide for maximum utilization of such product streams in downstream operations.

In modern chemical and refinery processing, the use of separation means such as fractionation, extractive distillation, liquid-liquid extraction and azeotropic distillation to separate feed streams prior to passing feed streams to a further separations means, such as additional distillation, extraction etc., or to reaction equipment is quite often used. Such separation means generally separate the feed material into an overhead and a bottoms stream with one or both streams then going to the further separations means or to a reactor for conversion. In such instances, it is conventional to continually introduce a given quantity of feed into the primary separations column and continuously remove product overhead and from the bottom of such column. If such systems could operate perfectly, the overhead and bottoms streams would consistently have a constant volume and a constant composition. However, to date such perfection does not exist. Therefore, there is significant variation in volume and/or composition of the overhead and bottoms products. If the separations column is operated to meet a particular product composition specification, generally, the volume of products from the column will vary significantly as a result of manipulation of temperature, pressure or reflux ratio in the column to meet a constant product composition. If the separations column is operated to maintain a constant volume of overhead and bottoms, generally, the composition of these products will vary significantly. In most instances where the products of the separations column go forward to further separation means or reaction equipment, it is necessary to the processing scheme to maintain a substantially constant composition of such products. As a result, product quantity varies significantly resulting in operation of the downstream separations means or reaction equipment at widely varying capacity levels which in turn results in loss of much capacity and product.

It is now an object of the present invention to provide an improved method for the separation of fluid streams. Another object of the present invention is to provide a method for controlling a separation system. A further object of the present invention is to provide a method of controlling separation systems such as fractionation columns, extractive distillation columns, liquid-liquid extraction columns and azeotropic distillation columns, whereby product streams of substantially constant volume and composition may be obtained. A remaining object of the present invention is to provide a method for the control of separations columns which allows the use of relatively simple control equipment. Additional objects will become apparent from the following description of the invention herein disclosed.

SUMMARY OF THE INVENTION

The present invention, which fulfills these and other objects, is a process for the continuous separation of a feed mixture in a separation zone having a plurality of product streams withdrawn from said separation zone, at least one of said product streams being withdrawn from an upper region of said separation zone and at least one of said product streams being withdrawn from a lower region of said separation zone, said process comprising passing said feed mixture to a column in said separation zone setting at least one of said product streams of said column at a constant takeoff volume, measuring a property representative of the composition of one of said product streams and converting said measurement to a signal representative of said measurement and using said signal to manipulate the flow rate of said feed mixture in response to such measurement such that such measurement remains substantially constant at a predetermined value.

From the above, it may be seen that the present invention differs from the prior art systems in that a product of constant composition and volume is obtained with feed rate being the controlled variable. In the past, more complicated means such as control of temperature, pressure, overhead and/or bottoms product have been attempted to effect either constant composition or constant volume or both. By keeping the product stream at constant volume and composition, the downstream processing equipment using such product stream can be operated at a higher average capacity thereby permitting the processing of larger quantities of material per unit time. The advantage of such operation is believed apparent in that it allows substantially full loading of downstream processing equipment thereby reducing utilities cost per unit of product. Such loading is at the expense of variations in feed rate and since the feed quite frequently is received not from other processing equipment but from storage, such variation does not result in any increase in operating costs or create problems for other processing equipment.

DESCRIPTION OF THE DRAWINGS

FIGS. 5 and 6 of the drawings are plots illustrating the results of the operation of a distillation column from which a product is fed to another distillation column downstream of said first distillation column, FIG. 5 representing conventional operation and FIG. 6 illustrating operation in accordance with the present invention.

DESCRIPTION OF THE PREFERRED EMBODIMENTS

Figure 1:
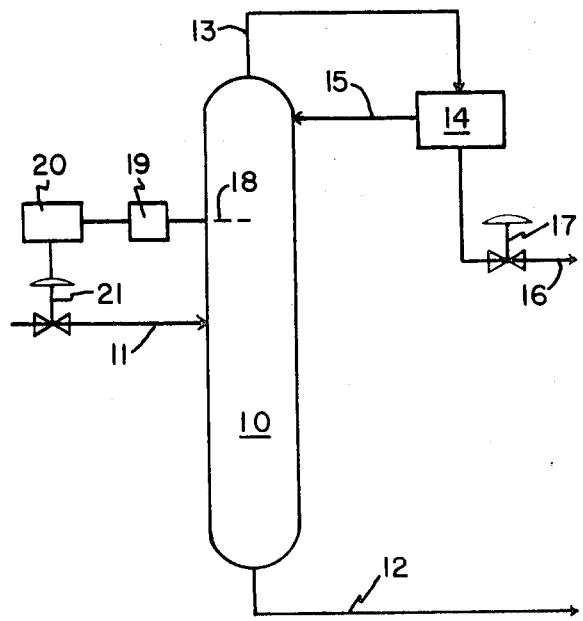
FIG. 1 of the drawings is a diagram of a fractional distillation column operated in accordance with an embodiment of the present invention.

In order to more fully explain the present invention, reference is made to the accompanying drawings. In the drawings, like characters are used throughout to denote like features.

Referring FIG. 1, the feed mixture to be separated is passed into fractional distillation column 10 by means of feed inlet line 11, usually at a point intermediate the ends of the column. The optimum point of introduction will vary depending upon the composition of the feed mixture and the separations desired and may be readily determined by those skilled in the art. A bottoms product comprising the heavier components of the feed mixture is withdrawn through line 12. An overhead fraction comprised of lighter components of the feed mixture is withdrawn from column 10 through line 13 and is condensed in condenser 14. From condenser 14, a portion of the overhead is returned to column 10 by means of line 15. The remainder of the condensed overhead passes from condenser 14 to further downstream processing by means of line 16. A valve 17 is provided in line 16 to control the volume of overhead product removed from the column 10. In accordance with the present invention, this valve 17 is preset such as to provide a constant volume of fluid takeoff from condenser 14 through line 16 to the further downstream processing.

A temperature determining probe 18 is provided in column 10 to sense the temperature in an upper segment of the column above the point of introduction of feed mixture through line 11. The temperature in such area of the column is indicative of the composition of the vapors passing up the column which in turn is indicative of the composition of the final overhead product. A temperature indicator controller 19 is connected to probe 18 and receives a signal from probe 18 indicative of the temperature sensed thereby. Temperature indicating controller 19 then produces an output signal which is directly related to this temperature and the output signal is passed to a controller 20 which provides for manipulation of valve 21 in line 11 such as to control the flow rate of the feed mixture in feed inlet line 11. By controlling the flow rates of the feed mixture into column 10, the composition of the vapors passing up the column can be maintained relatively constant thereby providing for the composition of the overhead also to be maintained constant. This in turn alleviates the need for alternating particularly reflux ratios but also temperatures or pressures in order to obtain the desired composition and thereby allows for a constant volume takeoff from column 10 of a product which has a constant composition meeting desired specifications.

Instead of the temperature measuring probe 21 referred to above, other means of measuring a property of the vapors which property is indicative of composition may be used. A continuous sampling means may be installed and the vapor samples analyzed by refractive index, specific gravity, chromatography or other analytical means. With some feed mixtures, it may be found that certain analytical techniques such as temperature measurement, are not adequate and thus, some other method must be used. The determination of the best method of analyzing compositions of products of the distillation column is well within the ability of those skilled in the art. Any means whereby a product may be quantitatively analyzed may be used as a basis for the output signal which will control valve 21 to vary the feed rates to obtain constant composition across the area of measurement.

While FIG. 1 has shown measurement of the overhead product stream composition by means of measuring the temperature of vapors within column 10 at a point above feed inlet line 11, many other points of measurement may be used. For instance, referring particularly to FIG. 2, an an analyzer 22 is connected by line 23 to overhead takeoff line 13 whereby a continuous analysis of the overhead product is obtained. Analyzer 22 produces a signal output which is sent to controller 20 in the event the analysis of the overhead deviates from the established predetermined desired overhead composition. Controller 20 in turn opens or closes, as the case may be, valve 21 to increase or decrease the flow of feed mixture into column 10 whereby the composition of the overhead is brought back to the desired composition.

Figure 2:
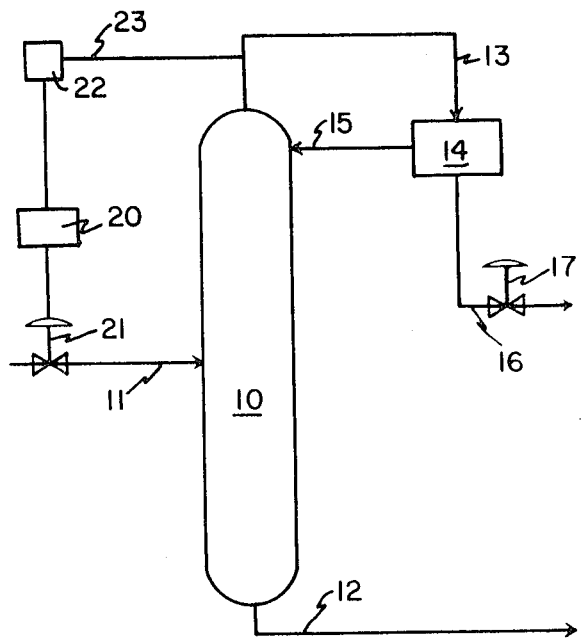
FIG 2 of the drawings is a diagram of fractional distillation column operated in accordance with another embodiment of the present invention.

In addition to measuring the vapors flowing up through column 10 or the overhead as illustrated in FIGS. 1 and 2, still other points may be used for measurement. For example, the vapors in the lower portion of column 10 or the liquid holdup within column 10 may be analyzed. Additionally, the bottoms products may be analyzed or the overhead liquid product may be measured as to composition. Generally, it is preferred to measure at a point as close to the feed inlet line as possible, yet at a point where a measurement can be obtained which is relatively accurate with respect to correlation with the desired product composition. By obtaining the measurement which is indicative of the product composition within the column and as near the inlet line as possible, the time lag between manipulation of the flow rate of the feed mixture and the result of such manipulation on the composition is reduced.

Figure 3:
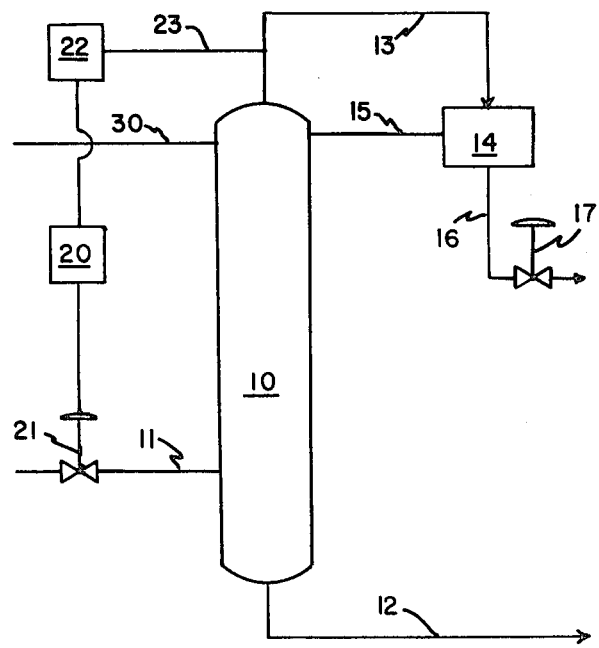
FIG. 3 of the drawings is a diagram of an extractive distillation column operated in accordance with an embodiment of the present invention.
Figure 4:
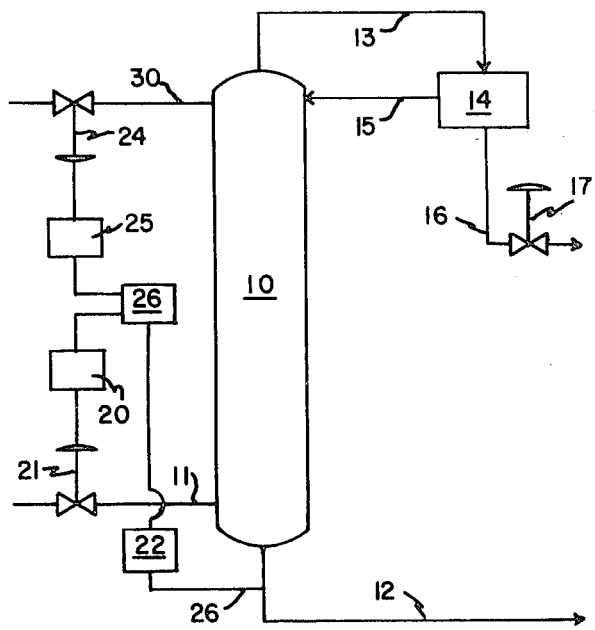
FIG. 4 of the drawings is a diagram of an extractive distillation column operated in accordance with another embodiment of the present invention.

Referring now to FIG. 3, the operation of an extractive distillation column in accordance with the present invention is described. A feed mixture to be separated is introduced into a distillation column 10 by means of feed inlet line 11. As noted above, the optimum point of introduction of the feed mixture into column 10 will vary depending upon feed composition, separations desired and other considerations well known to those skilled in the art and may be readily determined. Concurrently with introduction of the feed mixture, a solvent having a selective affinity for one or more of the components of the feed mixture is introduced into column 10 through line 30 at a point above the inlet point of the feed mixture. Generally, the solvent is introduced at or near the top of the distillation column. An overhead fraction is withdrawn from column 10 by means of line 13 that is condensed in condenser 14. This overhead fraction comprises primarily those components of the feed mixture having higher volatilities as a result of lack of affinity of the solvent for such components. From condenser 14, a portion of the overhead is returned to column 10 by means of reflux return line 15. The remainder of the condensed overhead passes by means of line 16 to a reactor (not shown) within which the components of the overhead are converted to desired product. Valve 17 in line 16 is preset to provide for the removal of a constant volume of product from condenser 14. A bottoms product containing rich solvent is removed from column 10 by line 12. A product analyzer 22 is connected by means of line 23 to overhead takeoff line 13 whereby a continuous analysis of the overhead product is obtained. If the composition of the overhead product is analyzed by analyzer 22 varies from a predetermined composition, a signal is produced by analyzer 22 which signal is sent to controller 20 which manipulates valve 21 in feed inlet line 11 to either increase or decrease the feed input to column 10 through feed inlet line 11. If desired, valve 21 which is manipulated by controller 20 in response to the output signal of analyzer 22 may be in solvent inlet line 30 to thereby manipulate the solvent feed flow rate in response to signals from analyzer 22. In addition, as illustrated in FIG. 4, both the flow rate of the solvent feed and the feed mixture to be separated may be manipulated in response to a signal from analyzer 22. In such embodiment of the present invention, a valve 24 is placed in the solvent inlet line 30 and valve 21 is placed in feed inlet line 11 with valve 24 being connected to a controller 25 and valve 21 being connected to a controller 20. Controllers 25 and 20 are in turn connected to a signal proportioning device 26, in response to signals from analyzer 22 which is connected by line 26 to bottoms product takeoff line 12, determines and controls the proportion of the increases or decreases, as the case may be, of flow rate of solvent to feed mixture entering column 10.

While the above description of embodiments of the present invention included embodiments in which an overhead product was preset for constant volume and constant composition, the present invention is not limited. The constant volume product takeoff may as well be a bottoms product or a side draw product. Additionally, the feed to the separations zone may be introduced by one or more feed inlet lines with the feed rate of either one or all of any such plurality of feed lines being varied in response to a measurement of a property representative of the composition of one of said product streams.

To specifically illustrate the operation of the present invention, reference is made to FIGS. 5 and 6. These figures are plots of the average lbs./hr. of a bottoms product of substantially constant composition obtained from a prefractionation system each day over a period of 27 days. In FIG. 5, the prefractionation system is operated in conventional manner while in FIG. 6, it is operated in accordance with the present invention. The prefractionation system was one comprised of two columns each producing an overhead and a bottoms product but with the first column providing for a side draw intermediate its end which side draw was sent to the second column as feed. The bottoms product from this second column was then sent to a reactor which converted the hydrocarbons in such bottoms to other materials. The lbs./hr. of product plotted in FIGS. 5 an is the bottoms product from the second column. Prior to installation of the control system of the present invention, the prefractionation system was controlled in a conventional manner with a constant feed input to the first column. The bottoms product from the second column was analyzed by boiling range and when such composition deviated from the predetermined value, the reflux ratio of the first column was adjusted sufficiently to bring the bottoms from the second column back to the predetermined boiling range. As may be seen from FIG. 5, the lbs./hr. of bottoms product from the second column varied very erratically and substantially. It will be further noted that the average lbs./hr. of such bottoms product was approximately 34,600 lbs./hr.

In applying the present invention to this prefractionation system, a temperature indicating probe was inserted in the first column at a point just above the feed entry point to such column. This temperature indicating probe was in turn connected to a temperature indicating controller which was in turn connected to a controlling device which was in turn connected to a valve placed in the feed entry line to the first column. The bottoms product line from the second column was preset to deliver a constant volume of bottoms product of the same predetermined composition as was used as the basis for control of the above-described conventionally operated system. As temperature, as determined by the temperature indicating probe, varied from a predetermined value, the temperature indicating controller produced a signal which was sent to the controller which manipulated the valve to either increase or decrease the feed flow into the column. The result of operation of this system may be seen in FIG. 6. The average daily bottoms product output from the second column as shown in FIG. 6 is substantially constant with an average output above 35,000 lbs./hr.

From comparison of FIGS. 5 and 6, advantages of the present invention is believed readily apparent. As a result of the production of a substantially constant volume of bottoms products which, as noted above, is to be fed to a reactor, it is much easier to standardize the conditions of the reactor and operate such reactor with a savings in utilities costs. In addition, because of the higher average output of bottoms product, the reactor can be operated at a higher throughput and thus, a higher product rate.

Instruments for carrying out the functions of controlling, measuring and analyzing in accordance with the present invention are well known to the art. Any of those commonly employed for carrying out these functions may be utilized in the present invention. Determination of the best instruments to use is well within the ability of those skilled in the art and the particular instrument employed will in many instances vary from embodiment to embodiment of the present invention and to the particular application to which it is put.

The separation method of the present invention may be applied to the separation of virtually any mixture of organic compounds which can be separated by distillation, extractive distillation, liquid-liquid extraction and azeotropic distillation. Among the specific utilizations to which the present invention may be applied are the separation by fractional distillation of such systems as $C_8$ aromatic streams to obtain styrene grade ethylbenzene as an overhead, systems involving the prefractionation of reformer, cracking, hydrogenation, dehydrogenation, etc., feeds to obtain a select cut of such feeds for further processing, extractive distillation systems such as the separation of $C_4$ hydrocarbons with furfural, dimethylformamide and the like, and other such separations.

What is claimed is:

1. A process for the continuous separation of a feed mixture in an extractive distillation zone having an overhead product stream withdrawn from the upper portion thereof and a bottoms stream withdrawn from the lower portion thereof, said process comprising passing a feed mixture into said zone intermediate the ends thereof and passing a solvent into the upper portion of said zone above the point of introduction of said feed mixture, setting and maintaining at least one of said product streams of said zone at a constant takeoff volume, measuring the composition of at least one of said streams and converting said measurement to a signal representative of said measurement and using said signal to manipulate the flow rates of said feed mixture and said solvent in response to such measurement such that such measurement remains substantially constant at a predetermined value.

2. The process of claim 1 wherein said product stream set and maintained at a constant takeoff volume is the bottoms stream.

3. The process of claim 1 wherein said product stream set and maintained at a constant takeoff volume is the overhead stream.

* * * * *